United States Patent [19]
Jin

[11] Patent Number: 5,459,968
[45] Date of Patent: Oct. 24, 1995

[54] OFFICE FLOOR SYSTEM

[76] Inventor: Min W. Jin, 105-103 Banpo Apartment, 955 Banpo-Dong, Kangnam-Ku, Seoul, Rep. of Korea

[21] Appl. No.: 271,793

[22] Filed: Jul. 7, 1994

[51] Int. Cl.$^6$ .............................. E04F 15/00; E04F 15/02; E04F 15/024
[52] U.S. Cl. ..................... 52/126.6; 52/126.2; 52/220.2; 52/220.8; 52/263
[58] Field of Search .................. 52/126.1, 126.2, 52/126.4–126.7, 220.1, 220.2, 220.8, 263; 174/37

[56]  References Cited

U.S. PATENT DOCUMENTS

| | | | |
|---|---|---|---|
| 2,869,301 | 1/1959 | Benton | 52/263 |
| 4,348,841 | 9/1982 | Ueno et al. | 52/126.5 |
| 4,593,499 | 6/1986 | Kobayashi et al. | 52/126.6 |
| 4,596,095 | 6/1986 | Chalfant | 52/126.6 |
| 4,621,468 | 11/1986 | Likozar | 52/126.6 |
| 4,996,804 | 3/1991 | Naka et al. | 52/126.6 |
| 5,052,156 | 10/1991 | Tanaka et al. | 52/126.6 |
| 5,072,557 | 12/1991 | Naka et al. | 52/126.6 |
| 5,187,907 | 2/1993 | Takeda et al. | 52/126.2 X |

FOREIGN PATENT DOCUMENTS

| | | | |
|---|---|---|---|
| 0091351 | 3/1990 | Japan | 52/126.6 |
| 406010490 | 1/1994 | Japan | 52/126.1 |

*Primary Examiner*—Michael Safavi
*Assistant Examiner*—Robert J. Canfield
*Attorney, Agent, or Firm*—Nolte, Nolte and Hunter

[57]  ABSTRACT

An office floor system effectively and clearly accommodating complex and varieties of wires and providing a delightful atmosphere for an automated office. The system includes a floor panel. The top surface of the panel has a plurality of bolt adjusting holes and a first opening for receiving an integrated outlet box therein. The bottom surface of the panel has a supporter and a plurality of bolt leading holes. The corner of the floor panel is supported by a panel support unit at the downside of the panel such that the corner of the panel is adjusted in its height at its upside so as to achieve the horizontality of the panel. The panel support unit has a plurality of holes for providing flexibility for the unit and a plurality of inner threaded support columns. The system also includes a bolt for adjusting the height of the corner of the panel. This height adjusting bolt is received in a corresponding bolt leading hole of the panel at its slitted top part and threaded into a corresponding support column of the panel support unit at its outer threaded lower part, thus to be tightened or loosened at the upside of the panel so as to adjust the height of the corner of the panel.

3 Claims, 4 Drawing Sheets

OFFICE FLOOR SYSTEM

BACKGROUND OF THE INVENTION

1. Field of the Invention

The present invention relates in general to office floors suitable for an office automation flooring system and, more particularly, to an improved structure in such office floors for effectively and clearly accommodating complex and varieties of power lines and for providing a delightful atmosphere for a no paper office equipped with varieties of electronic equipment such as a main computer, personal computers, telephones and facsimiles.

2. Description of the Prior Art

Recently, the office buildings have been remarkably developed in both their designs for their outside appearances and their interiors as they are accounted much of their function as a center of business and life. The recent trend of office automation promotes the above development of office buildings.

In accordance with the office automation, pencils and papers of the office are substituted for by electronic equipment such as computers. An automated office is generally equipped with facsimiles for fast communication, a host computer for business management and personal computers. Lately, the office is also equipped with LAN (Local Area Network) and a video conference system, thus to become a base of transmission and reception of information. In this regard, the term, intelligent building system, is used for such an office building. Particularly, office automation is promoted by the development of LAN.

Office automation is attended with layout of varieties of wires for powering the electronic equipment. The varieties of power wires should be wired in accordance with a reasonable layout for achieving both the desired power supply and the maintenance of the wiring.

The above reasonable layout is achieved by an office flooring system which is a concern with the present invention.

In the prior art, such an office flooring for an automated office may have been achieved by a floor duct system. However, the conventional floor duct system has a problem in that it should be limited in the wiring capacity. Another problem of the above floor duct system resides in that it can not allow expansion of a communications network, since it has some difficulty in providing layout for new wires. Otherwise stated, the above floor duct system can not cope with the changed layout.

Alternatively, the wires may be buried in the floors of the building. However, this wiring method results in thickening of the floors of the building and shortens the height of each story of the building, thus to reduce the total volume of the building.

As a further alternative, the office flooring may be achieved by an access floor system. However, the access floor system has a problem in that it uneconomically wastes the space since its height is higher than 30 cm. The height of the access floor system higher than 30 cm is inevitable because it was proposed for used in a software center. The access floor system is a fixed type system, so that it can not allow the movable installation of outlet boxes. Particularly when installing integrated type outlet boxes on the access floor system, the boxes should be manufactured and assembled at the site. In addition, the above access floor system should be attended with grouting and this generates dust and increases the weight of the system. The increase of the weight of the system caused by the grouting results in overload of the building. In the above access floor system, the upper panel is simply laid on the panel support so that the panel should be distorted and generates noise such as a squeaking sound with the lapse of time.

SUMMARY OF THE INVENTION

It is, therefore, an object of the present invention to provide an office floor system in which the aforementioned problems can be overcome and which effectively and clearly accommodates complex and varieties of wires and for providing a delightful atmosphere for an automated office.

It is another object of the present invention to provide an office floor system which copes with the problems caused by the conventional floor duct system, the conventional access floor system and the like and which copes with the expansion of communications network and change of layout.

It is a further object of the present invention to provide an office floor system which is scarcely influenced by the height of each story of a building and remarkably reduces the load applied therefrom to the building.

In order to accomplish the above objects, an office floor system according to a preferred embodiment of the present invention comprises: a floor panel, the top surface of the panel having a plurality of bolt adjusting holes and a first opening for receiving an integrated outlet box therein, the bottom surface of the panel having reinforcing means and a plurality of bolt leading holes, the bolt leading holes communicating with the bolt adjusting holes respectively; a support unit for supporting a corner of the floor panel at the downside of the panel such that the corner of the panel is adjusted in its height at its upside so as to achieve horizontality of the panel, the panel support unit having: a plurality of holes for providing flexibility for the unit; and a plurality of inner threaded support columns; and a bolt for adjusting the height of the corner of the panel, the height adjusting bolt being received in a corresponding bolt leading hole of the panel at its slitted top part and threaded into a corresponding support column of the panel support unit at its outer threaded lower part, thus to be tightened or loosened at the upside of the panel so as to adjust the height of the corner of the panel.

In accordance with the office floor system of this invention, it is facilitated to install or remove a circular type outlet box or an integrated type outlet box.

The office floor system of this invention is suitable for accommodating both the communications network of the intelligent building system and the wiring capacity of the automated office. The office floor system of this invention is also facilitated to be installed or removed at the site and remarkably reduces its weight unlike the conventional access floor system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
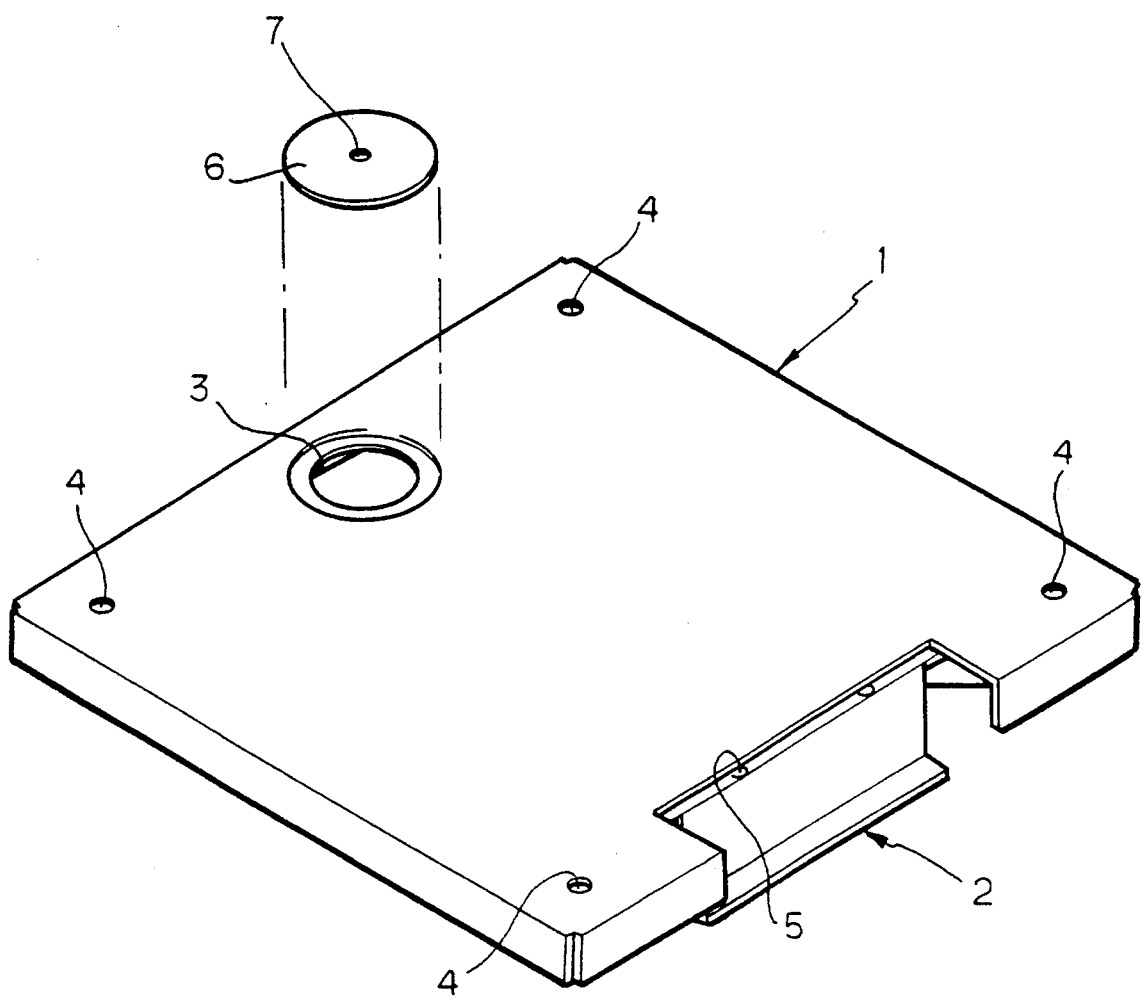
FIG. 1 is a perspective view of an upper floor panel of an office floor system in accordance with a preferred embodiment of the present invention.

With reference to FIG. 1, there is shown in a perspective view an upper panel of an office floor system in accordance with a preferred embodiment of the present invention. The panel 1 is made of a steel, preferably of a cold-rolled steel. The upper panel 1 is provided with an integrated type outlet box opening 2 which will receive an integrated type outlet box when the floor is practically used. The side of the opening 2 is bent into an L-shape so as to prevent its possible distortion. The upper panel 1 further includes another outlet box opening 3 which will receive a circular type outlet box. When the out-let box opening 3 receives no outlet box, it is covered with a cap 6. The cap 6 has a through hole 7 which can not pass all the wires of the circular type outlet box but passes one or two wires. The cap 6 thus still covers the outlet box opening 3 of the upper panel 1 when one or two wires are used. The upper panel 1 has four bolt adjusting holes 4 at its corners. With the holes 4, the panel can be easily adjusted in its height for maintaining the desired horizontality of the floor panels. That is, the desired horizontality of the panels 1 can be easily achieved by simply adjusting, using a screw driver, the height of a supporter 12 which will be described later herein. The integrated type outlet box opening 2 is provided with screw holes 5 for fixing the integrated type outlet box to the opening 2. When the opening 2 receives no outlet box, it is covered with a cap (not shown).

Figure 2:
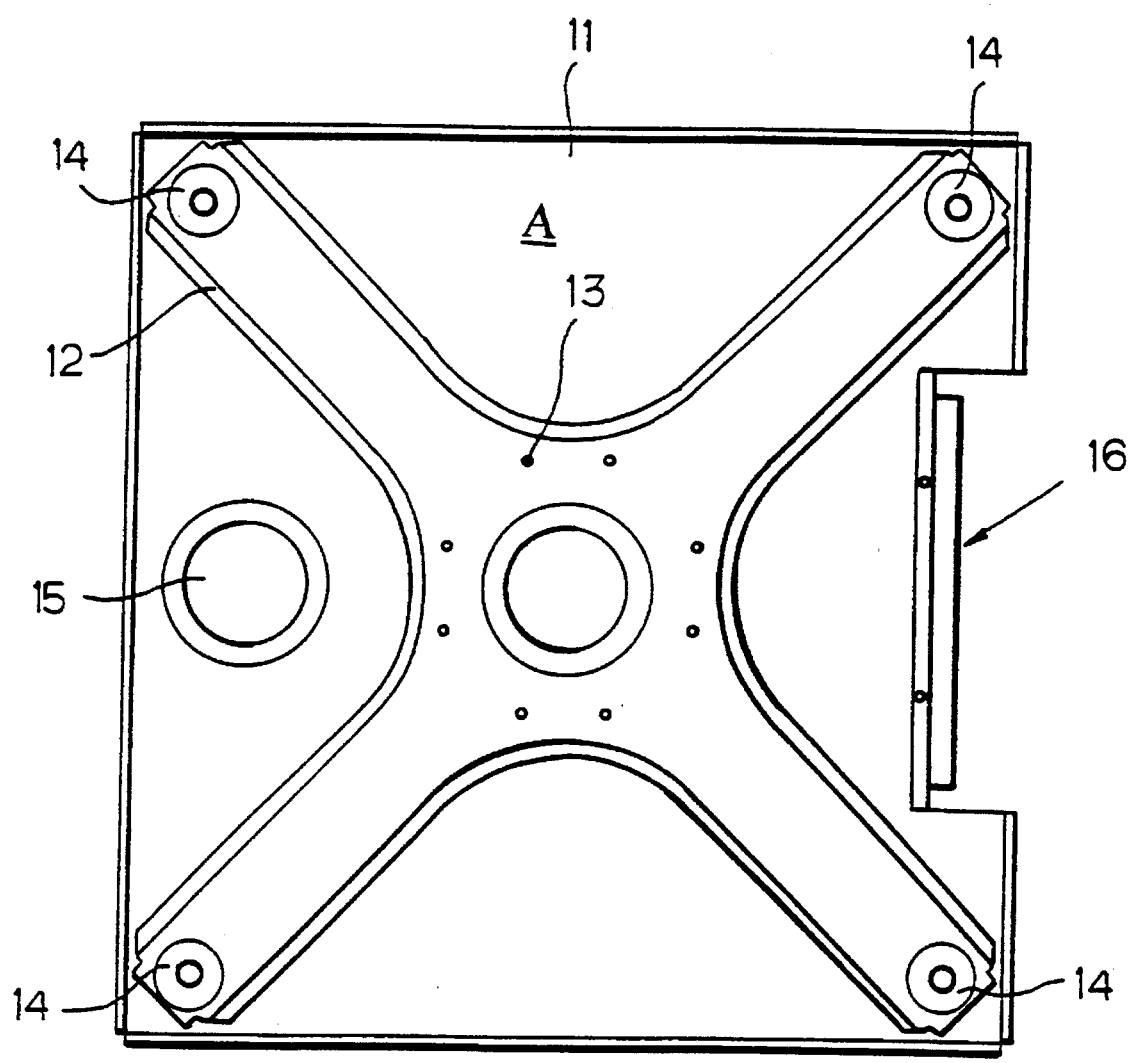
FIG. 2 is a bottom view of the upper floor panel of FIG. 1.

FIG. 2 is a bottom view of the panel 1 of FIG. 1. In this drawing, the bottom surface of the panel 1 is designated by the numeral 11. The bottom surface 11 of the panel 1 is provided with the cross supporter 12 for reinforcing the panel 1. The frame of the supporter 12 is flexible so that it prevents possible distortion as for example in area A of the panel 1. The flexibility of the supporter 12 is preferred in reinforcing the strength of the panel 1. A flexible reinforcer is capable of deforming slightly under impact to absorb energy, and returning to the original shape without permanent distortion and by spreading the energy over a distance it attenuates the distorting force applied to the panel under impact. The mounting of the cross supporter 12 to the bottom surface 11 of the panel 1 is preferably achieved by a robot welding system. This robot welding system is profitable from the viewpoint of welding uniformity, strength reinforcement and lengthening of the useful life of the product. The cross supporter 12 is provided with a plurality of small holes 13 about its center for reducing the noise of the upper panel 1, which noise may be generated when stepping on the panel 1. That is, the small holes 13 of the supporter 12 cause the resonance when the noise is generated in the upper panel 1, so that they reduce the noise. In the embodiment of FIG. 2, four pairs of small holes 13 are formed about the center of the cross supporter 12 such that they are spaced out at regular intervals. However, it should be understood that the number of the small holes 13 may be changed, that is, increased or decreased.

The free ends of the four arms of the cross supporter 12 are provided with their respective bolt leading holes 14 for receiving their bolts of the supporter 12, which bolts will be described later herein.

The bolt leading holes 14 of the supporters 12 are through holes so that the desired horizontality of the panels 1 can be easily achieved by simply adjusting the height of the supporter 12 using a screw driver at the upside of the panels 1. Each of the bolt leading holes 14 has an annular step at its middle portion which divides the hole 14 into a larger diameter lower section and a smaller diameter upper section. The stepped portion of the hole 14 seats upwardly a stainless steel washer 27, which washer 27 will be described in conjunction with the panel support unit 21 later herein. The washer 27 not only achieves a desired insulation but also prevents a possible separation of the bolt 25 from the panel 1. The prevention of the possible separation of the bolt 25 from the panel 1 reduces of noise of the panel 1.

In FIG. 2, the reference numerals 15 and 16 denote receptacles for the circular type outlet box and the integrated type outlet box received in the outlet box openings 3 and 2 of the panel 1 respectively.

Figure 3:
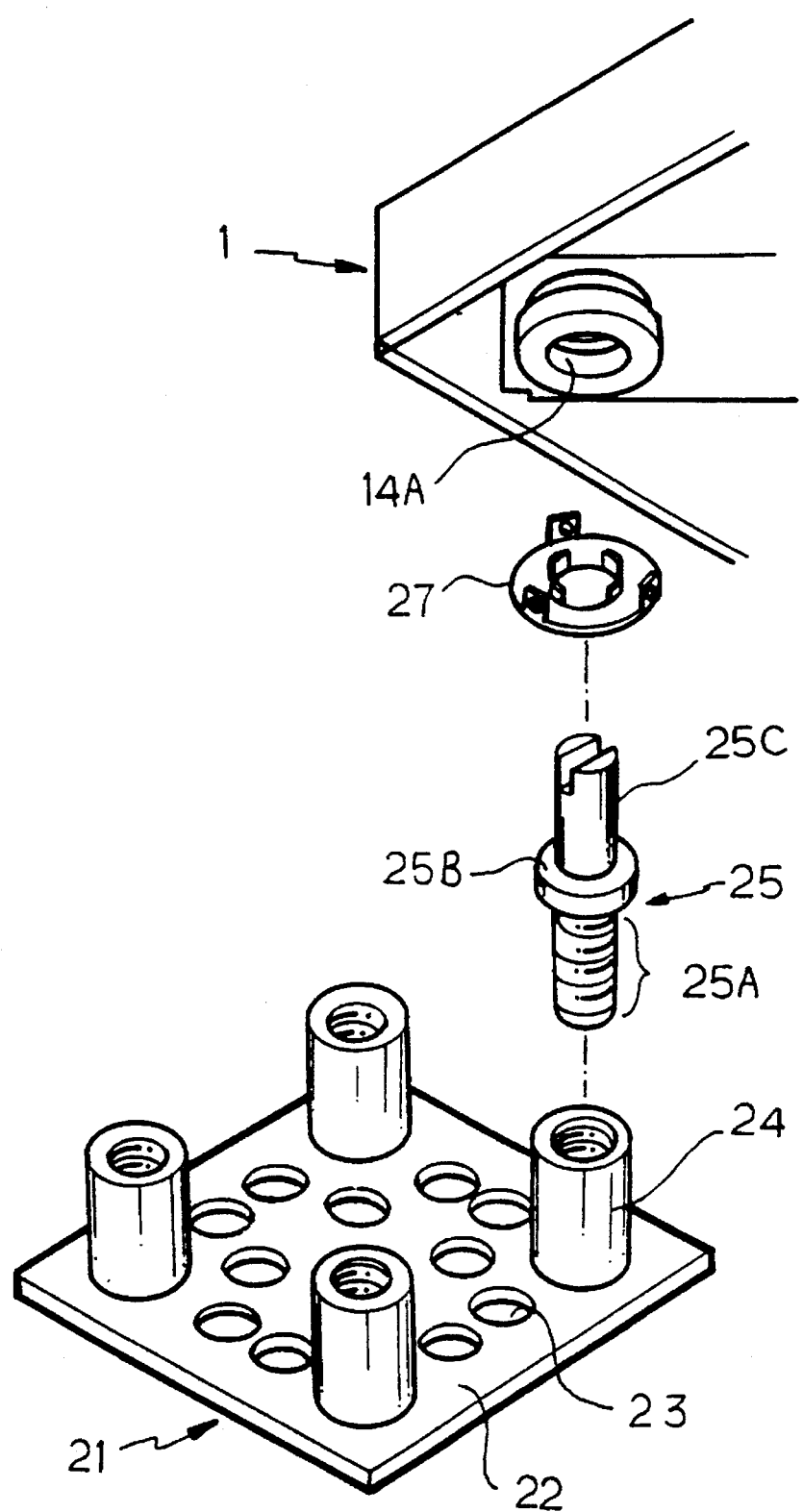
FIG. 3 is an exploded perspective view showing the coupling of a bolt leading hole of the panel of FIG. 2 to a panel support unit.

FIG. 3 is an exploded perspective view showing the coupling of the bolt leading hole 14 of the cross supporter 12 to a panel support unit 21. The panel support unit 21 is used for fixedly laying the floor panels 1 on a floor of a building. In laying the panels 1 on the building floor, a support plate 22 of the unit 21 is bonded to the building floor using an adhesive such as bonding agent. After bonding the support plate 22 to the building floor, the panel 1 of this invention is fixed to the support plate 21.

The support plate 22 of the panel support unit 21 is provided with a plurality of holes 23. With the holes 23, the support plate 22 can be easily deformed or bent so as to correspond to an uneven floor of the building when the office floor system of this invention should be laid on such an uneven floor of the building. The support plate 22 is provided with four support columns 24 at its corners. The inner threaded support columns 24 receive their respective height adjusting bolts 25.

Each of the height adjusting bolts 25 generally comprises three parts, that is, an outer threaded part 25A, a head part 25B and a slitted top part 25C. The outer threaded part 25A of the bolt 25 is directly received in the inner threaded support column 24 of the support plate 21. In order to tighten or loosen the bolt 25, the bolt 25 is turned in a direction by a screw driver received in the slit of the top part 25C of the bolt 25 at the upside of the panel 1. It should be understood that the size of the height adjusting bolt 25 may be freely changed in accordance with its use. That is, when it is required to use an office floor whose height is higher than 5 cm, the height of the embodiment of FIG. 3, the sizes of both the height adjusting bolt 25 and the support column 24 of the support plate 22 are changed in order to correspond to the height of the office floor.

As shown in FIG. 3, the washer 27 is received in the larger diameter lower section 14A of the bolt leading hole 14.

With reference to FIGS. 1 to 3, the height adjusting bolt 25 is inserted into the bolt leading hole 14 of the supporter 12 with interposition of the washer 27. In this case, the washer 27 stably grips the height adjusting bolt 25, thus to prevent possible separation of the bolt 25 from the panel 1 and to reduce the noise of the panel 1. Here, it should be understood that the washer 27 is manufactured considering the outer diameter of the top part 25C of the bolt 25, thus to achieve the above effect.

Figure 4:
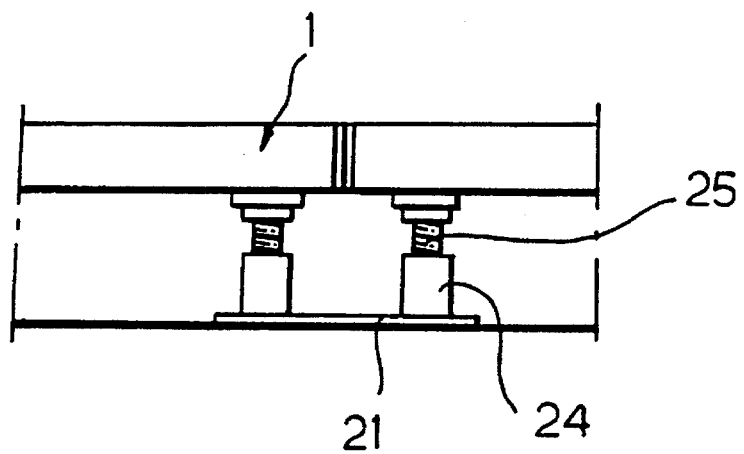
FIG. 4 is a side view showing the coupling of the bolt leading hole of the panel to the panel support unit.

FIG. 4 is a side view showing the coupling of the bolt leading hole 14 to the panel support unit 21. As shown in this drawing, each of the height adjusting bolt 25 which is threaded into a corresponding inner threaded support column 24 of the support plate 22 at its outer threaded part 25A is received in a bolt leading hole 14 of a corresponding panel 1 at its top part 25C. That is, each of the panel support unit 21 is placed at a cross, at which cross four panels 1 come into contact with each other, and supports four corners of those four panels 1 by its four support columns 24. After coupling the panels 1 to the panel support units 21, the height adjusting bolts 25 which are threaded into the inner threaded support columns 24 of the units 21 at their threaded parts 25A are manually handled. That is, the bolts 25 are tightened or loosened using a screw driver at the upside of the panels 1, thus to achieve the desired horizontality of the panels 1. In this case, the shank of screw driver is received in the bolt leading hole 4 of the panel 1 at the upside of the panel 1.

Figure 5:
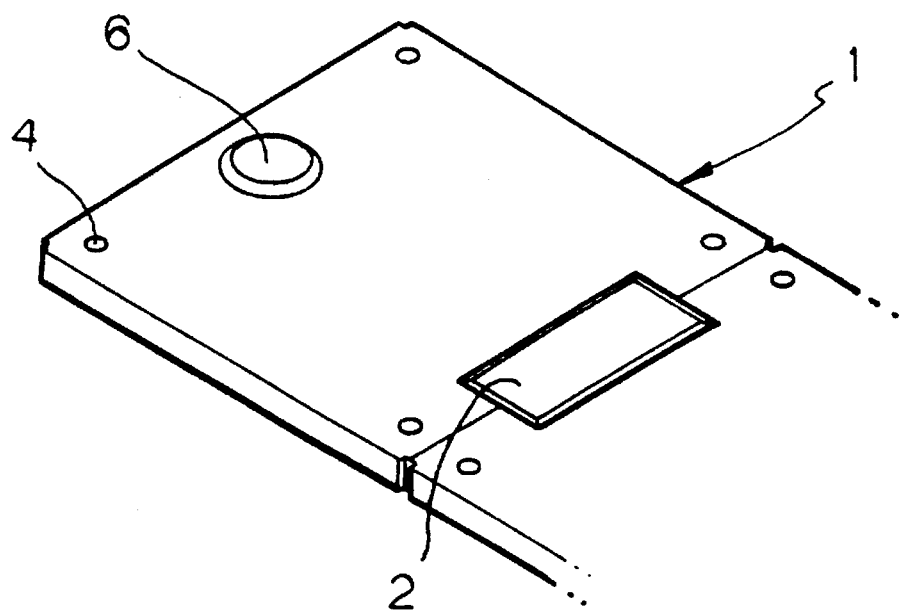
FIG. 5 is a perspective view showing the floor panels of FIG. 1 laid on a floor.

FIG. 5 shows the floor panels 1 of this invention laid on the building floor.

As described above, the office floor system according to the present invention overcomes the deficient wiring capacity of the conventional floor duct system and copes with the changed layout. The floor system also prevents waste of space unlike the conventional access floor system. The system is not subjected to the grouting so that it generates no dust and remarkably reduces its weight. Another advantage of the floor system of this invention resides in that the height adjusting bolt received in the floor panel is tightly gripped by a washer received in a bolt leading hole of the panel, thus preventing the separation of the bolt from the panel and reducing the noise such as a squeaking sound generated when stepping on the panel. The panel causes the resonance, thus reducing the noise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An office floor system comprising:

a floor panel, the top surface of said panel having a plurality of bolt adjusting holes and a first opening for receiving an integrated outlet box therein, the bottom surface of said panel having reinforcing means and a plurality of bolt leading holes, said bolt leading holes communicating with said bolt adjusting holes respectively;

a support unit for supporting a corner of said floor panel at the downside of the panel such that the corner of the panel is adjusted in its height at its upside so as to achieve horizontality of the panel, said panel support unit having:

a plurality of holes for providing flexibility for the support unit; and a plurality of inner threaded support columns; and a bolt for adjusting the height of the corner of the panel, said height adjusting bolt being received in a corresponding bolt leading hole of the panel at a slitted top part and threaded into a corresponding support column of the panel support unit at an outer threaded lower part, thus to be tightened or loosened at the upside of said panel so as to adjust the height of the corner of the panel.

2. The office floor system according to claim 1, wherein said floor panel further includes a second opening for receiving a circular outlet box therein, said second opening being selectively covered with a cap, said cap having a through hole for passing at least one wire therethrough so that the cap allows at least one wire to be used when the cap still covers the second opening, and each said bolt leading hole has a step portion, seating a washer thereon.

3. The office floor system according to claim 2, wherein said reinforcing means has a plurality of holes for generating resonance and reducing the noise generated when stepping on the panel, and said height adjusting bolt is gripped by said washer received in the bolt leading hole, thus to prevent separation of said height adjusting bolt from said panel and reduce the noise generated when stepping on said panel.

* * * * *